(12) United States Patent
Shiell et al.

(10) Patent No.: US 10,476,800 B2
(45) Date of Patent: Nov. 12, 2019

(54) SYSTEMS AND METHODS FOR LOAD BALANCING VIRTUAL CONNECTION TRAFFIC

(71) Applicant: Verizon Digital Media Services Inc., Dulles, VA (US)

(72) Inventors: Derek Shiell, Los Angeles, CA (US); Marcel Eric Schechner Flores, Los Angeles, CA (US); Sergio Leonardo Ruiz, Los Angeles, CA (US); David Andrews, Los Angeles, CA (US)

(73) Assignee: Verizon Digital Media Services Inc., Dulles, VA (US)

( * ) Notice: Subject to any disclaimer, the term of this patent is extended or adjusted under 35 U.S.C. 154(b) by 0 days.

(21) Appl. No.: 15/785,110

(22) Filed: Oct. 16, 2017

(65) Prior Publication Data

US 2019/0116123 A1 Apr. 18, 2019

(51) Int. Cl.
| | |
|---|---|
| *H04L 1/00* | (2006.01) |
| *H04L 12/803* | (2013.01) |
| *H04L 29/06* | (2006.01) |
| *H04L 12/741* | (2013.01) |
| *H04L 12/46* | (2006.01) |
| *H04L 29/08* | (2006.01) |

(52) U.S. Cl.
CPC ........ *H04L 47/125* (2013.01); *H04L 12/4641* (2013.01); *H04L 45/74* (2013.01); *H04L 67/1002* (2013.01); *H04L 69/08* (2013.01); *H04L 69/16* (2013.01); *H04L 69/161* (2013.01); *H04L 63/00* (2013.01); *H04L 67/42* (2013.01)

(58) Field of Classification Search
CPC ....... H04L 47/125; H04L 45/74; H04L 69/16; H04L 67/42
See application file for complete search history.

(56) References Cited

U.S. PATENT DOCUMENTS

| | | | |
|---|---|---|---|
| 2008/0043760 A1* | 2/2008 | Venkatraman | H04L 12/4641 370/401 |
| 2011/0264905 A1* | 10/2011 | Ovsiannikov | H04L 29/08792 713/151 |
| 2012/0036231 A1* | 2/2012 | Thakur | H04L 45/00 709/220 |

(Continued)

*Primary Examiner* — Abdelnabi O Musa
(74) *Attorney, Agent, or Firm* — Ansari Katiraei LLP; Arman Katiraei; Sadiq Ansari (57) ABSTRACT

A load balancing appliance distributes data packets across different virtual connections for ongoing communications with clients over a connectionless communication protocol including User Datagram Protocol (UDP) or Quick Internet UDP Connections (QUIC). The load balancing appliance a distributor that binds and listens on a port through which the connectionless traffic is received. The distributor distributes the traffic to a different set of managers at each interval based on each set of managers binding to and listening on a different set of ports. Each set of managers establishes and manages virtual connections establishing during a particular interval, wherein managing a virtual connection involves creating a secondary connection to a back-end server selected for engaging in ongoing communications with a client of the virtual connection, and performing any packet conversions between the virtual connection with the client and the secondary connection to the back-end server in order to bridge the connections.

14 Claims, 9 Drawing Sheets

(56) References Cited

U.S. PATENT DOCUMENTS

2014/0351447 A1\* 11/2014 Annamalaisami ........................... H04L 65/1069
709/227

\* cited by examiner

SYSTEMS AND METHODS FOR LOAD BALANCING VIRTUAL CONNECTION TRAFFIC

BACKGROUND ART

The Transmission Control Protocol (TCP) is a networking protocol for reliable transfer of data packets over a digital network, such as the Internet. TCP has existed for several decades and a large amount of data traffic is still passed using TCP.

TCP trades off performance for reliability. The tradeoff is due in part to the overhead for establishing connections between messaging endpoints and various legacy flow control mechanisms initially conceived for high latency, low bandwidth, and unreliable network links. A three-way handshake is conducted to establish a connection between TCP messaging endpoints. TCP has a slow start mechanism for restricting the initial rate at which data packets are passed over the established connection and a window size regulating the number of unacknowledged data packets that can be sent over the connection at any given time. These and other TCP mechanisms ensure that data packets arrive at their intended destination, that all sending nodes communicating over a network link work collectively to reduce congestion over that link, and that a lost packet is resent without having to resend other large blocks of data.

The User Datagram Protocol (UDP) is a different networking protocol that trades off reliability for performance. UDP removes much of the TCP overhead associated with reliable transport to maximize transfer rates. UDP is commonly used for time sensitive applications including video streaming, audio streaming, and gaming as some examples.

Quick Internet UDP Connections (QUIC) is a connectionless protocol developed to preserve the performance advantages of UDP and the reliability of TCP. Generally, QUIC transmits data packets using UDP with client-side and server-side adaptations of various TCP reliability features including acknowledgement of received packets. Since reliable transfer is necessary for many Internet-based communications and the amount of data being transferred continues to grow, QUIC is a possible replacement for TCP.

QUIC is, however, poorly suited for implementation in a load balanced environment. In such environments, a load balancer or other director receives data packets that are directed to two or more servers. The load balancer quickly and efficiently identifies packets of an ongoing communication and forwards those packets to the same server so that the server can have an uninterrupted exchange with the client. This persistent distribution is simplified in TCP as packets of an ongoing communication relate to the same established connection. The load balancer tracks established TCP connections and forward packets based on the TCP connections to which they relate. In practice, the load balancer tracks TCP connections based on a unique tuple such as the source address, source port, destination address, and destination port. Packets with tuples matching a tuple of established connection are forwarded along that connection.

QUIC, like UDP, is connectionless. Load balancers do not engage in the TCP connection establishment handshake in order to track different connections between different clients. Load balancers therefore do not have connection or state information to achieve the persistent distribution. Without this information, a first packet from a client directed to an ongoing communication may be forwarded to a first server by the load balancer while a subsequent second packet from the client directed to the same ongoing communication may be forwarded to a second server.

QUIC introduces "virtual connections" by adding a connection identifier field in the public header of QUIC packets. Load balancers currently do not read or track information associated with this field. Even if they did, the load balancers would need an efficient and quick means by which to identify and establish new virtual connections, track active virtual connections, and remove inactive or terminated virtual connections so that memory and resource usage does not grow unbounded with every new virtual connection that is made. More generally, there is a need for effective and efficient load balancing of connectionless traffic in a multi-server environment, whereby the connectionless traffic is persistently distributed across two or more servers in the multi-server environment as is done with TCP traffic across established TCP connections.

BRIEF DESCRIPTION OF THE DRAWINGS

A preferred embodiment for load balancing of connectionless traffic will now be described, by way of example only, with reference to the accompanying drawings in which.

DETAILED DESCRIPTION

Disclosed are systems and methods for load balancing connectionless traffic. A load balancing appliance serves as a point of ingress for connectionless network data traffic and provides a persistent distribution of the connectionless traffic, including User Datagram Protocol (UDP) based traffic and Quick Internet UDP Connections (QUIC) traffic, across two or more back-end servers. In some embodiments, the load balancing appliance is a load balancer, director, front-end server, or other server performing a dual load balancing and content distribution role. In other words, the load balancing appliance can directly respond to a first subset of the received connectionless data traffic while distributing a second subset of the received connectionless data traffic to other servers for response.

Figure 1:
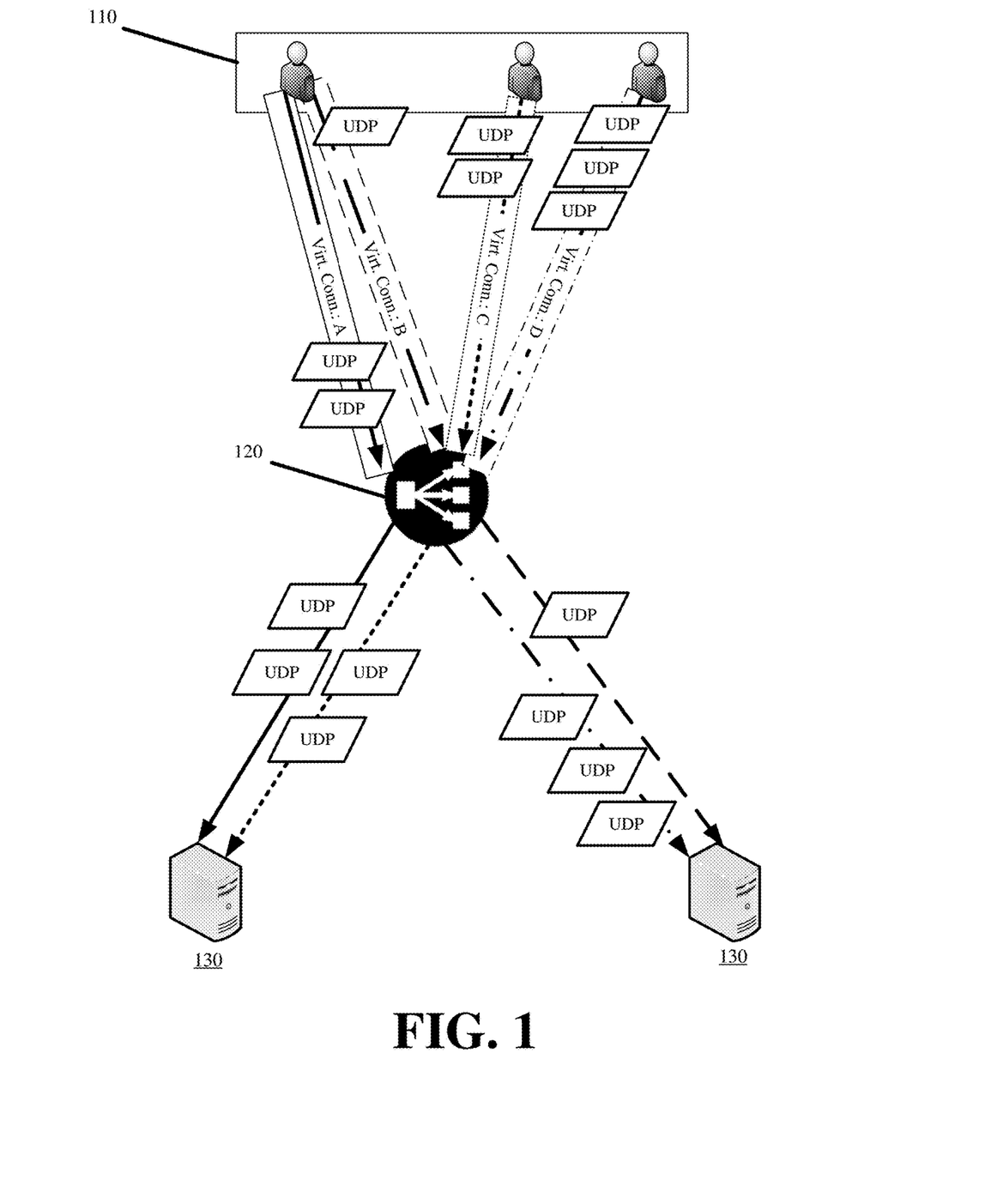
FIG. 1 conceptually illustrates load balancing of connectionless traffic in accordance with some embodiments.

FIG. 1 conceptually illustrates load balancing of connectionless traffic in accordance with some embodiments. The figure illustrates different clients 110, the load balancing appliance 120 of some embodiments, and different back-end servers 130. This architecture is common within a content delivery network (CDN), cloud service provider, or other distributed platform operating multiple servers for the distribution of content or services, although in FIG. 1 and in the discussion that follows, the architecture is adapted for the distribution of connectionless traffic across the back-end servers 130.

The load balancing appliance 120 receives connectionless data packets from different clients 110. The connectionless data packets can include UDP datagrams or messages, or QUIC messages.

The load balancing appliance 120 distributes the connectionless data packets of the same ongoing communication for a particular application, content, or service with a client 110 to the same back-end server 130. To track the different simultaneous ongoing communications, the load balancing appliance 120 establishes different "virtual connections" with the clients 110 as described in detail below.

For each virtual connection, the load balancing appliance 120 selects a back-end server 130 to engage in the ongoing communication with the client 110 and to respond with the desired application, content, or service. The load balancing appliance 120 then forwards the packets of a virtual connection to the selected back-end server 130.

In some embodiments, the load balancing appliance is implemented with a virtual connection distributor (hereinafter "distributor") and different sets of virtual connection managers (hereinafter individually referred to as a "manager") for establishing and maintaining the virtual connections. Such an implementation of the load balancing appliance provides the appliance with scalability to handle greater numbers of virtual connections, and also provides the appliance with effective and efficient tracking of active virtual connections and removal of terminated or inactive virtual connections.

The distributor is a process or thread that runs independent of separate processes or threads through which each manager of the different sets of managers execute. The distributor and the different sets of managers execute on hardware of the load balancing appliance. Various hardware of the load balancing appliance is described with reference to FIG. 9 below. The distributor and the different sets of managers can scale to handle more virtual connections by executing across hardware of two more computing machines.

The distributor binds to one or more ports through which the load balancing appliance receives connectionless traffic (e.g., UDP packets or QUIC packets). In some embodiments, the distributor binds to port 443. The distributor then performs a persistent distribution of the received packets across the set of managers that are instantiated for the current interval, wherein a different set of managers is instantiated and executes during each interval.

In some embodiments, the persistent distribution by the distributor involves hashing one or more header fields of the received connectionless traffic. In some such embodiments, the distributor performs a modulo operation on the connection identifier field found in the public header or plaintext (unencrypted) portion of QUIC data packets. Per the QUIC protocol, the connection identifier is a pseudo random number selected by a client with which to identify a virtual connection. By hashing on the connection identifier field, the distributor provides each manager with the packets associated with the virtual connections managed by the manager. The modulo operation can also be performed on the source IP address or a combination of the source IP address and connection identifier. In some embodiments, a cookie may be stored in the connection identifier field of the connectionless traffic. The cookie identifies the manager that initially established the connection with the client such that the distributor can directly identify the manager from the cookie.

Instantiation of a set of managers involves generating the processes or threads for each manager of the set of managers. The number of managers to instantiate at each interval is configurable. The number of managers to instantiate can be based on the load experienced by the load balancing appliance or the number of virtual connections received by the load balancing appliance.

Figure 2:
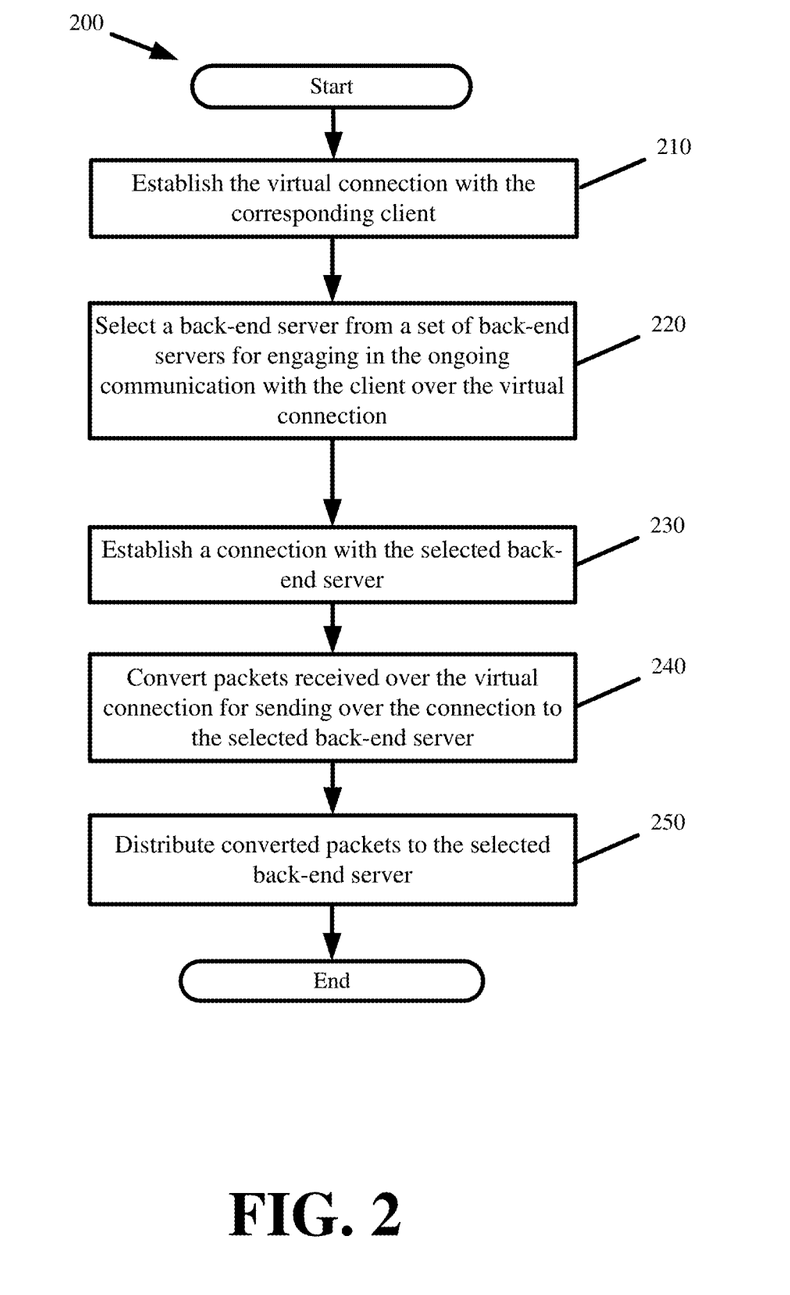
FIG. 2 presents a process presenting the steps associated with managing a virtual connection in accordance with some embodiments.

Each manager from a set of managers manages a different subset of virtual connections that are established during the particular execution interval for that set of managers. FIG. 2 presents a process 200 presenting the steps associated with managing a virtual connection in accordance with some embodiments.

The process includes establishing (at 210) the virtual connection with the corresponding client. The process selects (at 220) a back-end server from a set of back-end servers for engaging in the ongoing communication with the client over the virtual connection. The process then establishes (at 230) a connection with the selected back-end server to bridge the virtual connection. The process converts (at 240) the packets received over the virtual connection so that they can be distributed (at 250) to the selected back-end server over the bridged connection. The manager performs a reverse conversion for packets received from the selected back-end server for distribution back to the client through the virtual connection.

At the end of the particular interval, the set of managers enters graceful shutdown and stops receiving new virtual connections. A new set of managers are instantiated to manage the new virtual connections established during the next interval. The set of managers in graceful shutdown nevertheless continues managing the virtual connections established during the execution interval for that previous set of managers until those virtual connections terminate or become inactive at which time the managers can be individually removed from the load balancing appliance.

A hierarchical forwarding chain is created in some embodiments so that packets distributed by the distributor to the set of managers instantiated and executing during the current interval can be forwarded to the appropriate managers from previous intervals that established and continue to manage the virtual connections for those packets. The forwarding chain is facilitated in part by identifying the different sets of managers instantiated at the different intervals with the same set of identifiers but different port assignments, and by having instances of the same manager instantiated at different intervals track the port assignment for at least one previous instance of that manager.

Thus, each time a particular manager is instantiated for a different interval, the particular manager is identified by the same identifier. The identifier can be any numerical value. For example, first and second managers instantiated for a first interval can have first and second identifiers, and third and fourth managers instantiated for a later second interval can have the same first and second identifiers.

However, each time the particular manager is instantiated for a different interval, the particular manager is assigned a unique unused port, wherein the port assigned to a particular manager is unique not only with respect to the ports assigned to the other managers of the current set, but to all other managers in graceful shutdown that are still managing one or more active virtual connections. In some embodiments, the kernel running on the load balancing appliance assigns the unique unused port to each manager that is instantiated.

The managers bind to their assigned ports and begin listening for any packets addressed to those ports. The managers also enter their assigned ports along with their corresponding identifiers into shared memory of the load balancing appliance. The shared memory is accessible by the distributor and other managers.

The forwarding chain forms as a result of a manager with a particular identifier executing during a current interval reading and tracking from the shared memory, the port assignment of that manager from a previous interval. By reading and tracking the port-to-identifier assignment of a previous manager instance, the current set of managers can identify the previous set of managers in graceful shutdown. The current set of managers can then forward any packets for existing virtual connections that were established by the previous set of managers to those managers now in graceful shutdown. Additional sets of managers in graceful shutdown can similarly be identified by following the chain of port assignments.

Figure 3:
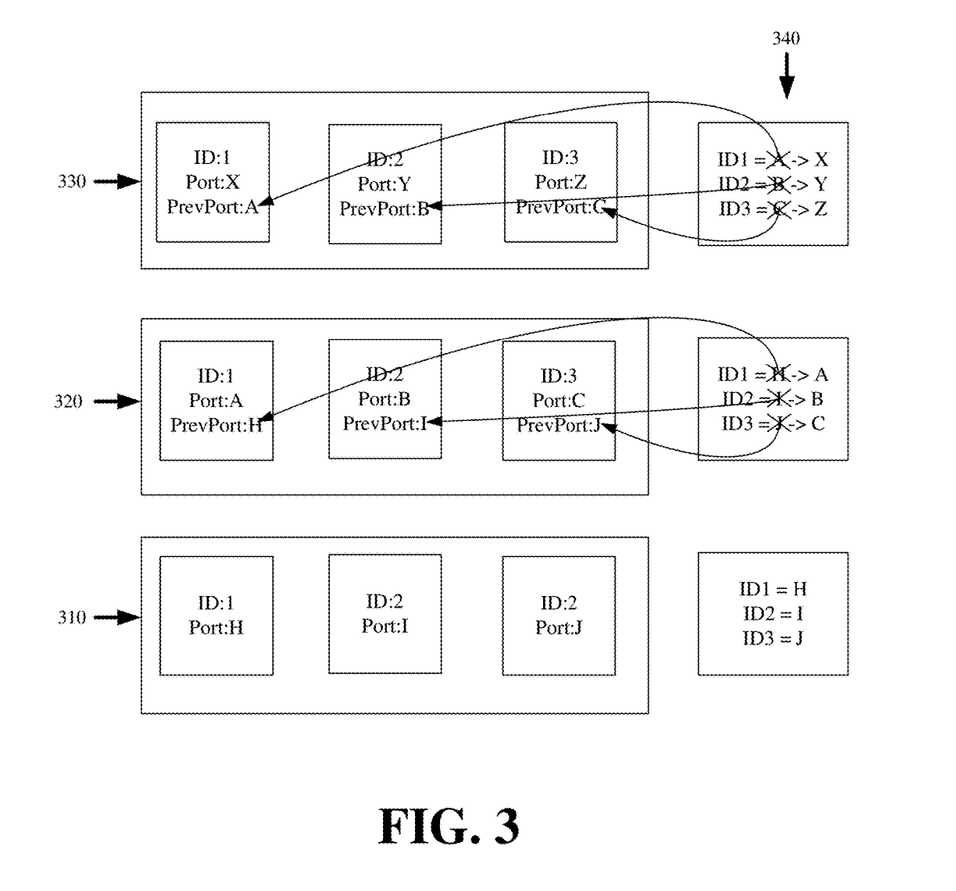
FIG. 3 conceptually illustrates tracking the port assignments for different sets of managers in accordance with some embodiments.

FIG. 3 conceptually illustrates tracking the port assignments for different sets of managers in accordance with some embodiments. The figure illustrates different sets of managers 310, 320, and 330 instantiated at different intervals, and a shared memory 340 populated with the port-to-identifier mappings at each interval.

Each manager from the first set of managers 310 enters its port assignment along with its identifier to the shared memory 340. At the conclusion of the first interval and the start of a second interval, the first set of managers 310 enters graceful shutdown and a second set of managers 320 are instantiated.

The second set of managers 320 shares the same identifiers with the first set of managers 310, but are assigned different ports. Each manager of the second set of managers 320 reads and tracks the port assignment of a manager from the first set of managers 310 with a similar identifier before overwriting the port assignment in the shared memory 340 with the port assigned to the newly instantiated manager of the second set of managers 320.

At the conclusion of the second interval and the start of a third interval, the second set of managers 320 enters graceful shutdown and a third set of managers 330 are instantiated. Upon instantiation, the third set of managers 330 similarly reads and tracks the ports assigned to the second set of managers 320 from the shared memory 340 before overwriting the entries with their own assigned ports.

Traversal of the forwarding chain commences in response to the persistent distribution by the distributor. As noted above, the distributor hashes one or more fields of each received connectionless data packet in order to select one manager from the set of managers executing during the current interval. Continuing with the example from FIG. 3 in which three managers are instantiated at each interval, the distributor computes the result of a packet connection identifier modulo three. The result points to the identifier of a particular manager from the set of managers. The distributor obtains the port assignment for the identifier of the particular manager executing during the current interval from the shared memory. The distributor then forwards the packet to the port. In particular, the distributor modifies the packet before forwarding to change the destination port of the original data packet to the particular port assigned to the particular manager executing during the current interval. In some embodiments, the distributor further spoofs the source address and port of the distributed data packet to retain the address and port of the client originating the data packet.

Figure 4:
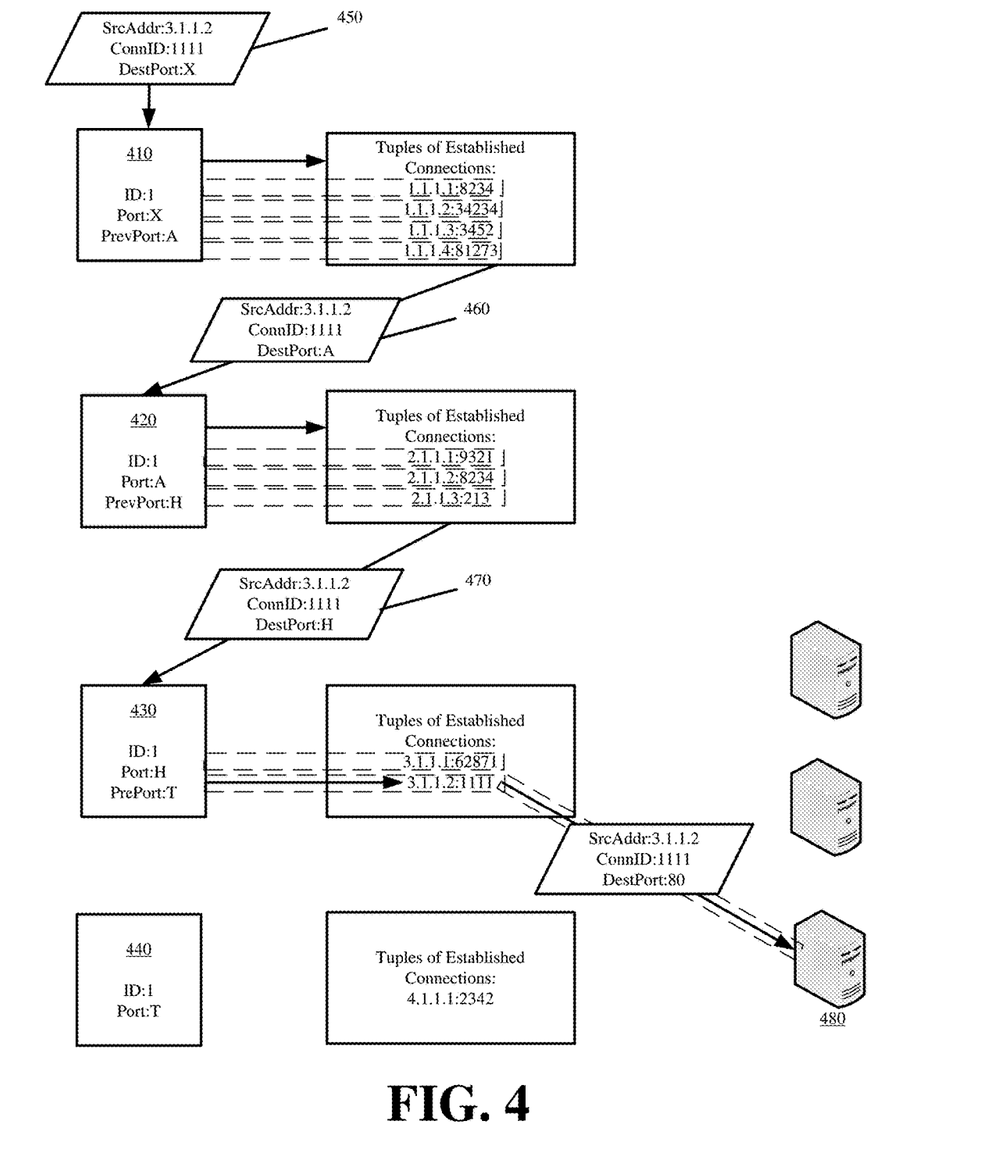
FIG. 4 illustrates the packet distributed by the distributor traversing the forwarding chain based on the tracked port assignments in accordance with some embodiments.

FIG. 4 illustrates the packet distributed by the distributor traversing the forwarding chain based on the tracked port assignments in accordance with some embodiments. The figure illustrates a chain with four instances 410, 420, 430, and 440 of a particular manager instantiated during different intervals. The first manager 410 at the top of the chain represents the manager instantiated and executing during a current interval. The second manager 420 in the chain represents the manager from the prior interval now in graceful shutdown. The third 430 and fourth 440 managers in the chain represent managers from even earlier intervals that are also now in graceful shutdown.

Each manager 410-440 is identified by the same identifier, is assigned a unique port, and retains the port assigned to the previous manager from reading the shared memory as described above with reference to FIG. 3. Each manager 410-440 tracks a unique tuple for the virtual connections establishing by that manager during its execution interval when the manager was accepting and establishing new virtual connections.

A connectionless data packet 450 is first received by the first manager 410 executing during the current interval. The packet tuple does not match any tuples tracked by this first manager 410. Accordingly, the first manager 410 obtains the port assignment for the second manager 420 in the chain and forwards the connectionless data packet to the second manager 420 by changing or otherwise spoofing the packet header. In particular, the destination port of the packet 460 is changed from the port assigned to the first manager 410 to the port assigned to the second manager 420. Further spoofing can be done to retain the original address and port of the client that originated the packet, rather than specify the first manager address and assigned port in the forwarded packet 460.

The packet tuple also does not match any tuples tracked by the second manager 420. The second manager 420 obtains the port assignment for the next previous manager instance or third manager 430 in the chain and forwards the connectionless data packet 470 to the third manager 430 with similar spoofing of the packet header.

The packet tuple matches a tuple for a virtual connection established by the third manager 430. Accordingly, the third manager 430 forwards the packet to a back-end server 480 selected for the matching virtual connection. As detailed below, further spoofing and connection bridging may be performed in forwarding the packet to the back-end server 480.

Figure 5:
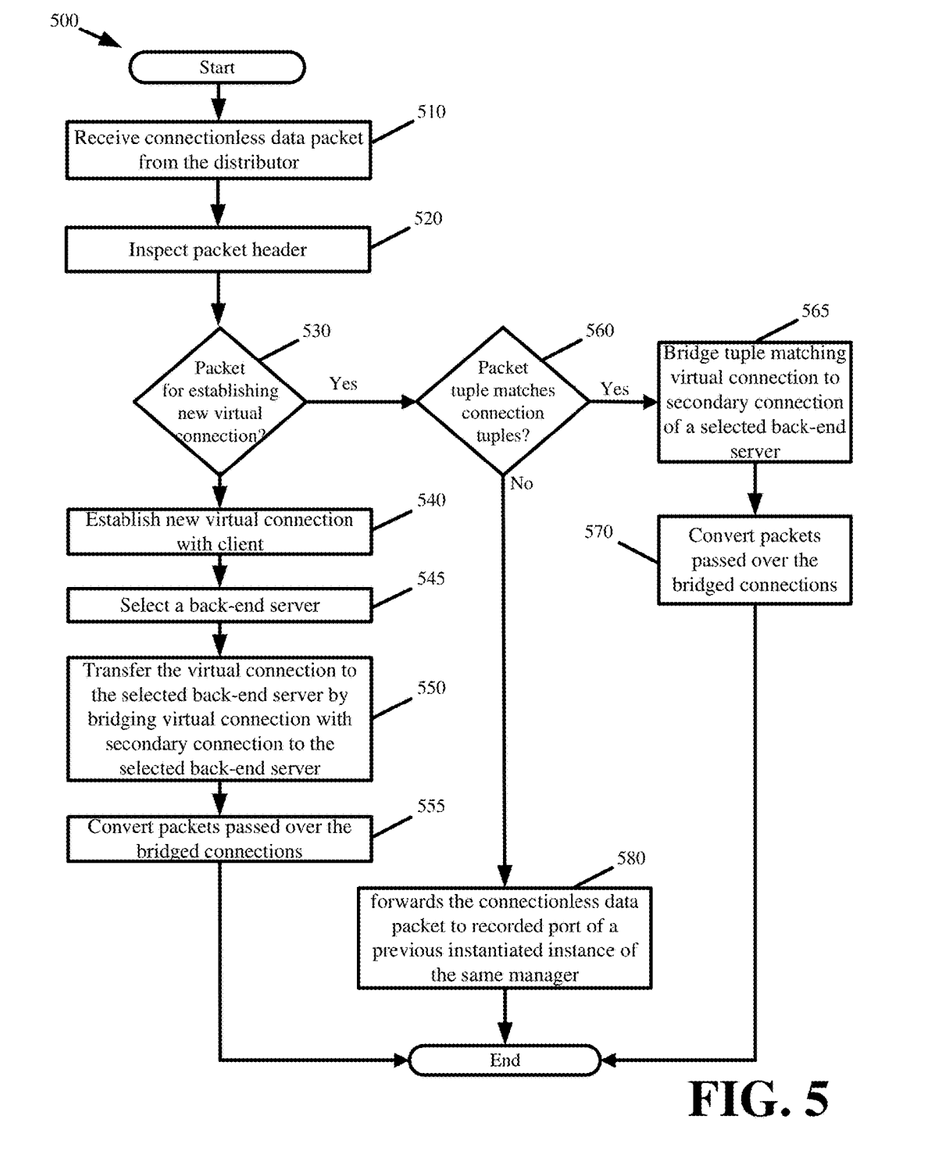
FIG. 5 presents a process for managing virtual connections through the forwarding chain in accordance with some embodiments.

FIG. 5 presents a process 500 for managing virtual connections through the forwarding chain in accordance with some embodiments. Process 500 is performed by each of the set of managers that have been instantiated and execute during a current interval.

The process 500 commences with a particular manager receiving (at 510) a connectionless data packet from the distributor. The process inspects (at 520) the header of the received connectionless data packet.

Based on the inspection, the process determines (at 530) whether the connectionless data packet is for an existing virtual connection or for establishing a new virtual connection. Packets for new virtual connections can be differentiated from packets of existing or already established packets in many ways. The QUIC protocol specifies a client hello message for establishing a new virtual connection. The client hello message is identified based on a specific tag in the message header and is issued in part to negotiate an encrypted connection. Thus, the client hello message is itself not encrypted, and thereby differentiated from packets for established virtual connections.

The process establishes (at 540) a new virtual connection in response to a connectionless data packet for establishing a new virtual connection. The virtual connection is established between the client sending the packet and the load balancing appliance manager that performs process 500 and receives the packet from the client. In establishing a QUIC virtual connection, the manager responds to the client with a server hello message that contains the negotiated encryption parameters for the new virtual connection. Establishing the new virtual connection further involves the manager storing a tuple for subsequent identification of the newly established virtual connection. One or more of the source IP address, source port, destination IP address, destination port, connection identifier, or other header fields can form the tuple identifying the newly established virtual connection. The tuple can be stored in the shared memory of the load balancing appliance, or in a partitioned memory space dedicated to the particular manager establishing the virtual connection.

The process selects (at 545) one of the available back-end servers to receive and respond to client communications over the virtual connection. The back-end server selection can be based on different configurable criteria including, without limitation, back-end server performance, back-end server load, requested content, or a round robin distribution as some examples. The back-end server selection may be made in conjunction with establishing the virtual connection. Alternatively, the back-end server selection may be made at a later time in response to receiving a subsequent connectionless data packet that is associated with the virtual connection and that contains a Uniform Resource Locator (URL) requesting a particular application, content, or service. In such cases, the manager can decrypt the packet, extract the URL, and select a back-end server from the available set of back-end servers based on a hash of the URL.

The process transfers (at 550) the virtual connection to the selected back-end server. In some embodiments, transferring the connection involves the process creating or reusing a secondary connection between the manager and the selected back-end server. The process then logically combines the secondary connection with the virtual connection to facilitate communications between the client and the selected back-end server. The same tuple used to identify the virtual connection can be used to identify the secondary connection and therefore the logical connection between the client and the selected back-end server.

In some embodiments, logically combining the connections involves converting (at 555) packets passed over the bridged connections. The packet conversion is performed when the secondary connection to the selected back-end server differs from the virtual connection to the client. In some such embodiments, the secondary connection is established using a different communication or transport protocol than the virtual connection. For instance, the secondary connection between the manager and selected back-end server is a TCP connection, whereas the virtual connection between the manager and the client is a QUIC virtual connection. Accordingly, the manager converts the QUIC formatted data packets sent by the client over the virtual connection to TCP data packets for receipt by the selected back-end server over the secondary connection. An inverse conversion is performed for packets traveling from the selected back-end server to the client.

Reverting back to step 530 and in response to a connectionless data packet for an existing virtual connection, the process compares (at 560) the virtual connection identifying tuple from the connectionless data packet to tuples of virtual connections established and tracked by the manager performing process 500. A match indicates that the packet is for ongoing communication over a virtual connection established by the current instantiated instance of the manager. A lack of a tuple match indicates that the packet is for an ongoing communication over a virtual connection established by a previous instance of the manager now in graceful shutdown.

In response to a tuple match, the process identifies (at 565) the secondary connection bridging the virtual connection to the back-end server selected to engage in the ongoing communication with the client. The secondary connection may be identified with the same tuple as used to identify the virtual connection. In some embodiments, the secondary connection is identified based on a hash of a URL of the connectionless data packet. The process then performs (at 570) packet conversion, if necessary, before forwarding the packet to the selected back-end server over the secondary connection.

In response to the connectionless data packet tuple not matching the tuples of any virtual connections established by the manager, the process forwards (at 580) the connectionless data packet to a previous instantiated instance of the same manager (i.e., manager with the same identifier). Here again, forwarding involves spoofing the packet header before sending. The manager retrieves the port assigned to the previous instance, wherein the port assigned to the previous instance was read out from the shared memory when the manager for the current instance was instantiated and assigned an unused port number. The manager then sets the source address and source port of the packet to match those set by the client originating the packet. The process further changes the destination port of the packet to the port assigned to the previous instance of the manager now in graceful shutdown. As per FIG. 4, the packet can be forwarded multiple times in the same manner until arriving at a manager instance in graceful shutdown that established the virtual connection for the packet at issue.

Management of the virtual connections is simplified when a manager enters graceful shutdown. Specifically, when the execution interval for a set of managers expires, each manager of the set of managers enters graceful shutdown and no longer receives requests for new virtual connections from the distributor. When in graceful shutdown, each manager manages its existing connections until they terminate or become inactive. A virtual connection terminates in response to a close message. A virtual connection becomes inactive after some period of time (i.e., a timeout period) during which no packets access the virtual connection. Accordingly, a manager starts a timer for each active virtual connection when in graceful shutdown. A similar timer and timeout interval is maintained for forwarding packets to previous manager instances. The timer for previous manager instances is maintained to prevent premature breaks in the manager chain when the previous manager instances retain one or more active virtual connections.

A manager releases all consumed resources in response to all virtual connections established by the particular manager terminating or becoming inactive, and further in response to the manager not forwarding for the timeout interval, any packets to prior manager instances also in graceful shutdown. The freed resources can be allocated to new manager instances or to support establishment of new virtual connections.

Some embodiments implement the load balancing appliance without the chaining between the different sets of managers. In so doing, the failure of a particular manager in graceful shutdown will not interrupt the virtual connections of other managers chained off the particular manager.

Some embodiments eliminate the forwarding chain by entering the active virtual connections for managers in graceful shutdown along with the port assigned to the corresponding manager into a shared database or the shared memory that is accessible by the distributor. Other active virtual connections established during the current interval are not explicitly enumerated in the shared database or shared memory.

Figure 6:
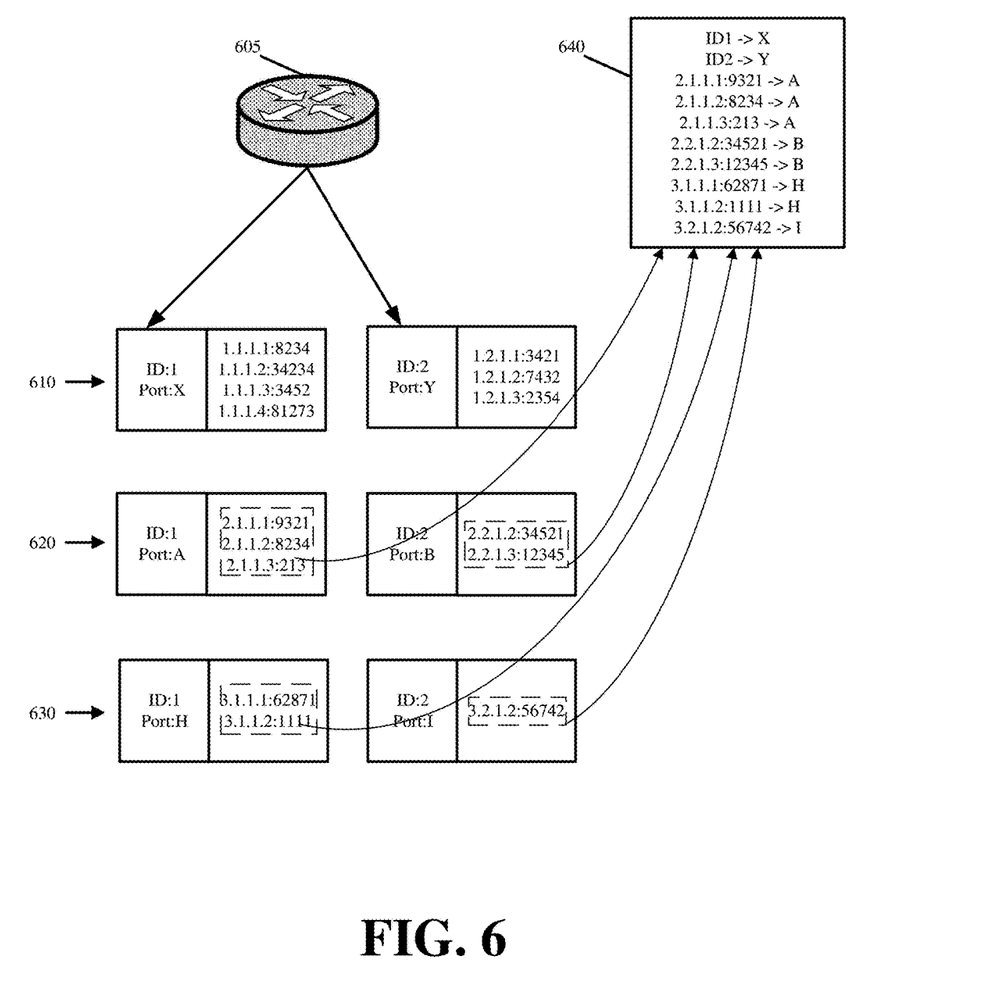
FIG. 6 conceptually illustrates populating the shared database with active virtual connections managed by managers in graceful shutdown.

FIG. 6 conceptually illustrates populating the shared database with active virtual connections managed by managers in graceful shutdown. The figure illustrates the load balancing appliance distributor 605, three sets of managers 610, 620, and 630, and a shared database 640 accessible by the distributor 605 and three set of managers 610-630.

The first set of managers 610 executes during a current interval. In doing so, each manager of the first set of managers 610 establishes new virtual connections with clients. However, the managers from the first set of managers 610 do not enter information about the newly established virtual connections into the shared database 640. Each manager of the first set of managers 610 does however enter its identifier and port assignment to the shared database 640.

The second and third sets of managers 620 and 630 are managers that have entered graceful shutdown. Upon entering graceful shutdown, each manager from these sets of managers 620 and 630 enters any established virtual connections that remain active into the shared database 640. In particular, each manager enters the tuple identifying an established connection along with the port assigned to the manager. Once a virtual connection managed by a manager in the second 620 or third 630 sets of managers is terminated or becomes inactive for a specified time period, the manager removes the corresponding entry from the shared database 640.

Figure 7:
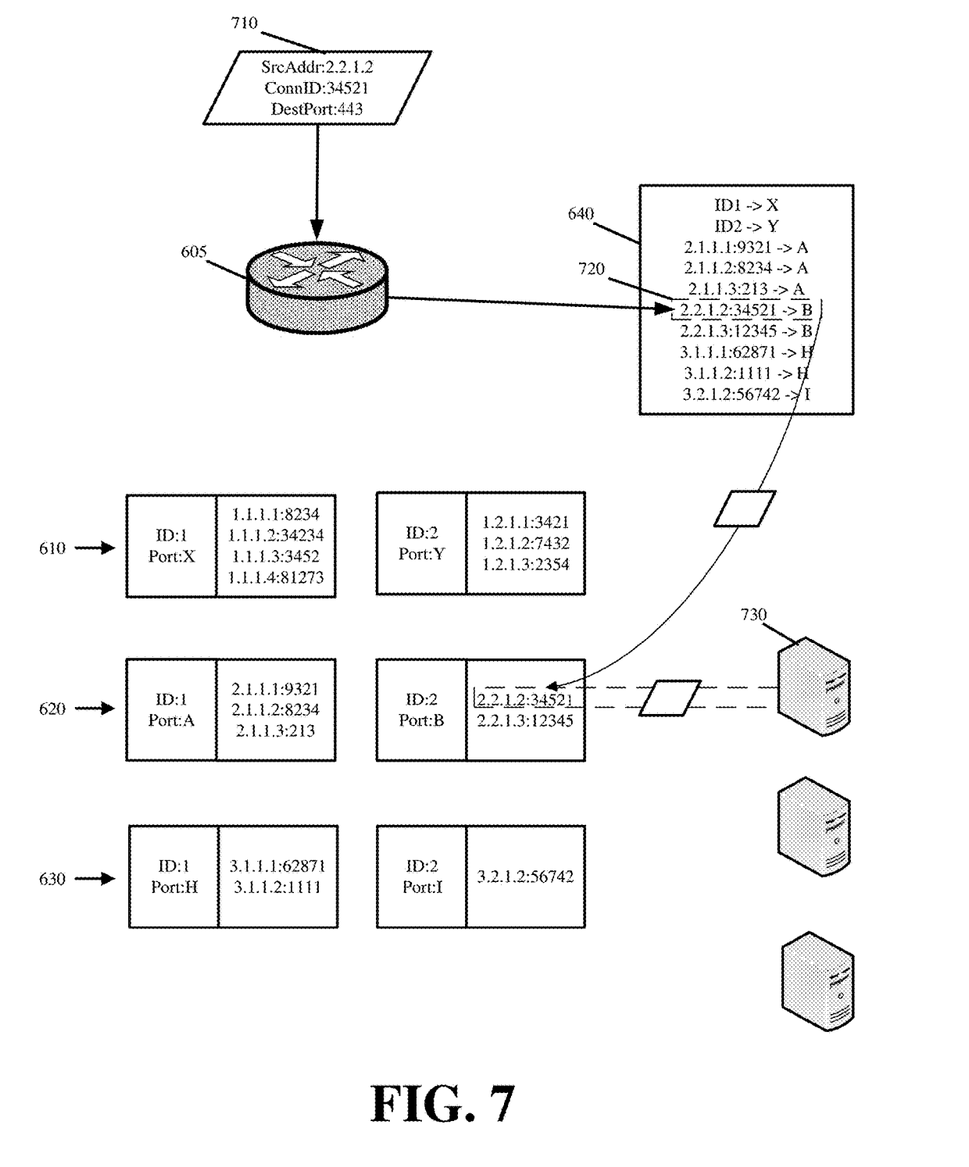
FIGS. 7 and 8 conceptually illustrate the direct distribution of connectionless data packets to active virtual connections in accordance with some embodiments.
Figure 8:
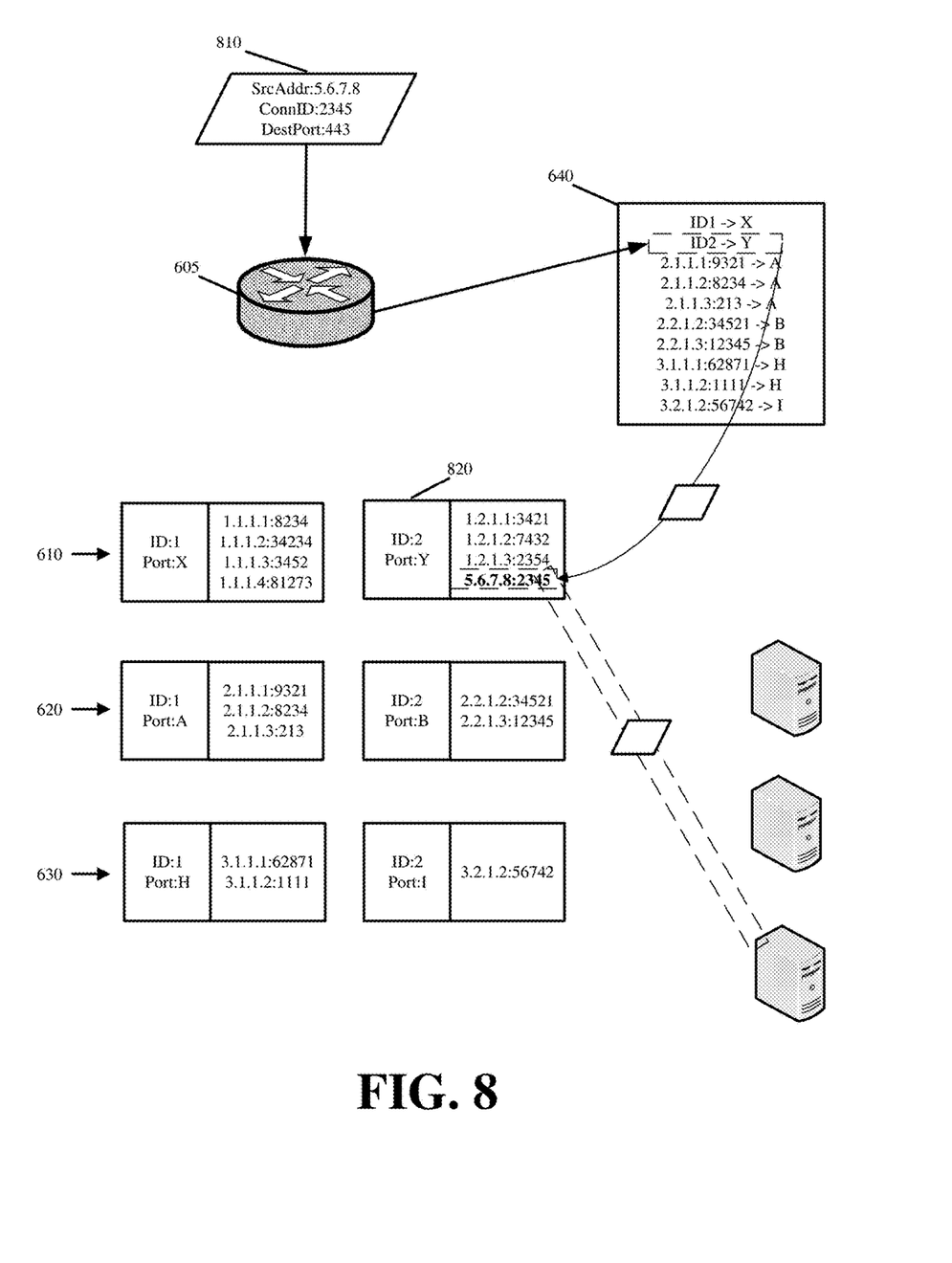

The distributor 605 modifies its operation and leverages the information from within the shared database 640 to perform a direct distribution of connectionless data packets to active virtual connections established by the different sets of managers instantiated during different intervals. FIGS. 7-8 conceptually illustrate the direct distribution of connectionless data packets to active virtual connections in accordance with some embodiments.

In FIGS. 7-8, the distributor 605 receives different connectionless data packets. The distributor 605 compares the tuple of each packet against the entries of the shared database 640 to identify the manager that manages the virtual connection for the packet.

In FIG. 7, the distributor 605 matches the tuple of a first connectionless data packet 710 to an entry 720 in the shared database 640. The entry 720 provides the port assigned to the second manager in the second set of managers 620. The distributor 605 directly forwards the first connectionless data packet to that manager by modifying the destination port of the data packet with the assigned port of the manager. The manager receives the first connectionless data packet 710, identifies the corresponding virtual connection, and the corresponding connection bridge to the back-end server 730 for the virtual connection. The manager then forwards the packet over the bridged connection to that back-end server 730.

In FIG. 8, the distributor 605 cannot match the tuple of a second connectionless data packet 810 to any entry in the shared database 640. Accordingly, the distributor 605 hashes more or more header fields of the second connectionless data packet 810 in order to select manager 820 in the first set of managers 610 to receive the packet 810. The distributor 605 then forwards the packet 810 to the selected manager 820. In this case, the second connectionless data packet is a request to establish a new virtual connection with the receiving manager 820 establishing the virtual connection.

Server, computer, and computing machine are meant in their broadest sense, and can include any electronic device with a processor including cellular telephones, smartphones, portable digital assistants, tablet devices, laptops, notebooks, and desktop computers. Examples of computer-readable media include, but are not limited to, CD-ROMs, flash drives, RAM chips, hard drives, EPROMs, etc.

Figure 9:
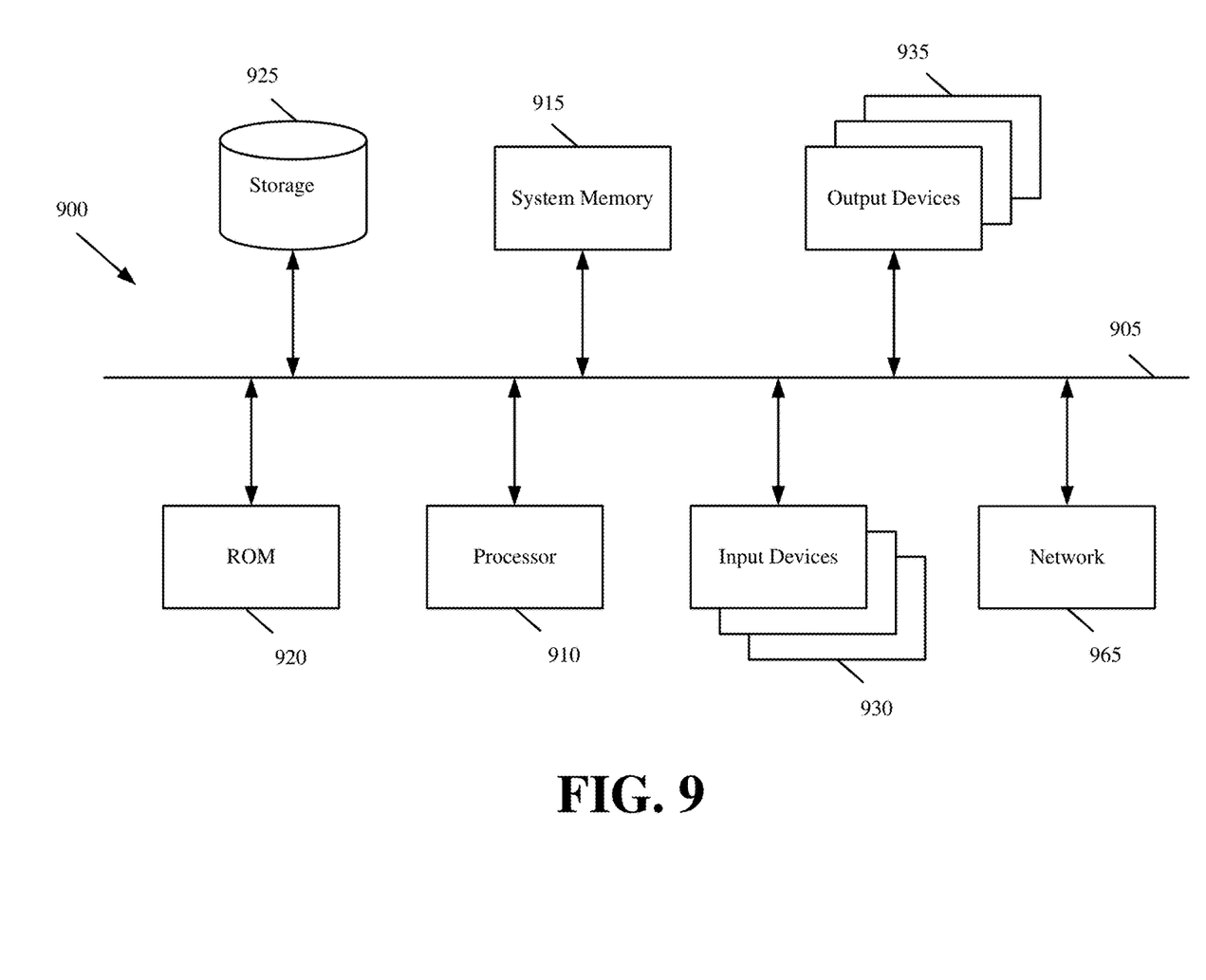
FIG. 9 illustrates a computer system or server with which some embodiments are implemented.

FIG. 9 illustrates a computer system or server with which some embodiments are implemented. Such a computer system includes various types of computer-readable mediums and interfaces for various other types of computer-readable mediums that implement the various methods and machines described above (e.g., load balancing appliance, back-end server, etc.). Computer system 900 includes a bus 905, a processor 910, a system memory 915, a read-only memory 920, a permanent storage device 925, input devices 930, and output devices 935.

The bus 905 collectively represents all system, peripheral, and chipset buses that communicatively connect the numerous internal devices of the computer system 900. For instance, the bus 905 communicatively connects the processor 910 with the read-only memory 920, the system memory 915, and the permanent storage device 925. From these various memory units, the processor 910 retrieves instructions to execute and data to process in order to execute the processes of the invention. The processor 910 is a processing device such as a central processing unit, integrated circuit, graphical processing unit, etc.

The read-only-memory (ROM) 920 stores static data and instructions that are needed by the processor 910 and other modules of the computer system. The permanent storage device 925, on the other hand, is a read-and-write memory device. This device is a non-volatile memory unit that stores instructions and data even when the computer system 900 is off. Some embodiments of the invention use a mass-storage device (such as a magnetic or optical disk and its corresponding disk drive) as the permanent storage device 925.

Other embodiments use a removable storage device (such as a flash drive) as the permanent storage device. Like the permanent storage device 925, the system memory 915 is a read-and-write memory device. However, unlike storage device 925, the system memory is a volatile read-and-write memory, such as random access memory (RAM). The system memory stores some of the instructions and data that the processor needs at runtime. In some embodiments, the processes are stored in the system memory 915, the permanent storage device 925, and/or the read-only memory 920.

The bus 905 also connects to the input and output devices 930 and 935. The input devices enable the user to communicate information and select commands to the computer system. The input devices 930 include alphanumeric keypads (including physical keyboards and touchscreen keyboards), pointing devices. The input devices 930 also include audio input devices (e.g., microphones, MIDI musical instruments, etc.). The output devices 935 display images generated by the computer system. The output devices include printers and display devices, such as cathode ray tubes (CRT) or liquid crystal displays (LCD).

Finally, as shown in FIG. 9, bus 905 also couples computer 900 to a network 965 through a network adapter (not shown). In this manner, the computer can be a part of a network of computers (such as a local area network ("LAN"), a wide area network ("WAN"), or an Intranet, or a network of networks, such as the Internet).

As mentioned above, the computer system 900 may include one or more of a variety of different computer-readable media. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ZIP® disks, read-only and recordable blu-ray discs, any other optical or magnetic media, and floppy disks.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A method for load balancing, the method comprising:
receiving packets of a connectionless protocol on a particular port of a load balancing appliance;
distributing, from the particular port to a first process listening on a first port of said load balancing appliance, packets for establishing a first set of virtual connections during a first interval, wherein the first port is different than the particular port;
distributing, from the particular port to a different second process listening on a different second port of said load balancing appliance, packets for establishing a second set of virtual connections during a later second interval that comes after the first interval, wherein the second port is different than the particular port and the first port;
receiving from the particular port, a connectionless data packet at the second port during the later second interval;
passing said connectionless data packet from the second port to the first port in response to at least one header parameter of said connectionless data packet not being associated with a connection from the second set of virtual connections; and
routing said connectionless data packet from the first port to a particular server of a plurality of servers in response to the at least one header parameter of said connectionless data packet being associated with a particular connection from the first set of virtual connections and said particular server hosting said particular connection.

2. The method of claim 1 further comprising tracking the first set of virtual connections during the first interval by storing identifiers identifying each of the first set of virtual connections with the first port, and tracking the second set of virtual connections during the second interval by storing identifiers identifying each of the second set of virtual connections with the second port.

3. The method of claim 2 further comprising matching a virtual connection identifier in the at least one header parameter of said connectionless data packet to one of said identifiers of the first set of virtual connections.

4. The method of claim 1, wherein said passing comprises spoofing addressing of said connectionless data packet.

5. The method of claim 4, wherein said spoofing comprises changing the destination port of said connectionless data packet from the second port to the first port.

6. The method of claim 5, wherein said spoofing further comprises changing a source address and a source port of said connectionless data packet from addressing associated with the second port to addressing of a client originating said connectionless data packet.

7. The method of claim 1 further comprising binding the first process to the first port prior to establishing the first set of virtual connections, and binding the second process to the second port prior to establishing the second set of virtual connections.

8. The method of claim 1 further comprising terminating said first process listening on the first port in response to each virtual connection of the first set of virtual connections terminating or becoming inactive.

9. A method comprising:
establishing a first set of connections between a load balancing appliance and a first set of clients while listening for new connection requests on a first port of the load balancing appliance during a first interval;
associating tuples identifying the first set of connections with the first port in memory of the load balancing appliance;
establishing a second set of connections between the load balancing appliance and a second set of clients while listening for new connection requests on a different second port of the load balancing appliance during a second interval after the first interval;
associating tuples identifying the second set of connections with the second port in memory of the load balancing appliance;
receiving a data packet at the load balancing appliance;
forwarding the data packet to the second port in response to at least one header parameter of the data packet being associated with a connection from the second set of connections, wherein the at least one header parameter is associated with the connection from the second set of connections based on a tuple from a header of the data packet matching a tuple of an established connection from the second set of connections and the tuple of the established connection from the second set of connections being associated with the second port; and
forwarding the data packet to the first port in response to the at least one header parameter of the data packet not being associated with a connection from the second set of connections based on one or more tuples from the header of the data packet not matching to the tuples of the second set of connections.

10. The method of claim 9 further comprising selecting via a process listening on the first port and in response to said forwarding to the first port, a back-end network connection to a particular back-end server from a plurality of back-end servers based on said tuple from the data packet.

11. The method of claim 10 further comprising sending said data packet from the first port of the load balancing appliance to the particular back-end server using said back-end network connection.

12. The method of claim 9, wherein establishing the first set of connections comprises entering a tuple identifying each connection of the first set of connections with said first port in the memory.

13. The method of claim 9 further comprising binding to a third port of the load balancing appliance, listening for new data packets associated with any of the first set connections and the second set of connections on said third port, distributing a first set of data packets arriving during the first interval from the third port to the first port, and distributing a different second set of data packets arriving during the second interval from the third port to the second port.

14. A load balancing appliance comprising:

a non-transitory computer-readable medium storing a set of processor-executable instructions; and one or more processors configured to execute the set of processor-executable instructions, wherein executing the set of processor-executable instructions causes the one or more processors to:

receive packets of a connectionless protocol on a particular port of said load balancing appliance;

distribute, from the particular port to a first process listening on a first port of said load balancing appliance, packets for establishing a first set of virtual connections during a first interval, wherein the first port is different than the particular port;

distribute, from the particular port to a different second process listening on a different second port of said load balancing appliance, packets for establishing a second set of virtual connections during a later second interval that comes after the first interval, wherein the second port is different than the particular port and the first port;

receive from the particular port, a connectionless data packet at the second port during the later second interval;

pass said connectionless data packet from the second port to the first port in response to at least one header parameter of said connectionless data packet not being associated with a connection from the second set of virtual connections; and route said connectionless data packet from the first port to a particular server of a plurality of servers in response to the at least one header parameter of said connectionless data packet being associated with a particular connection from the first set of virtual connections and said particular server hosting said particular connection.

\* \* \* \* \*